United States Patent Office 3,421,863
Patented Jan. 14, 1969

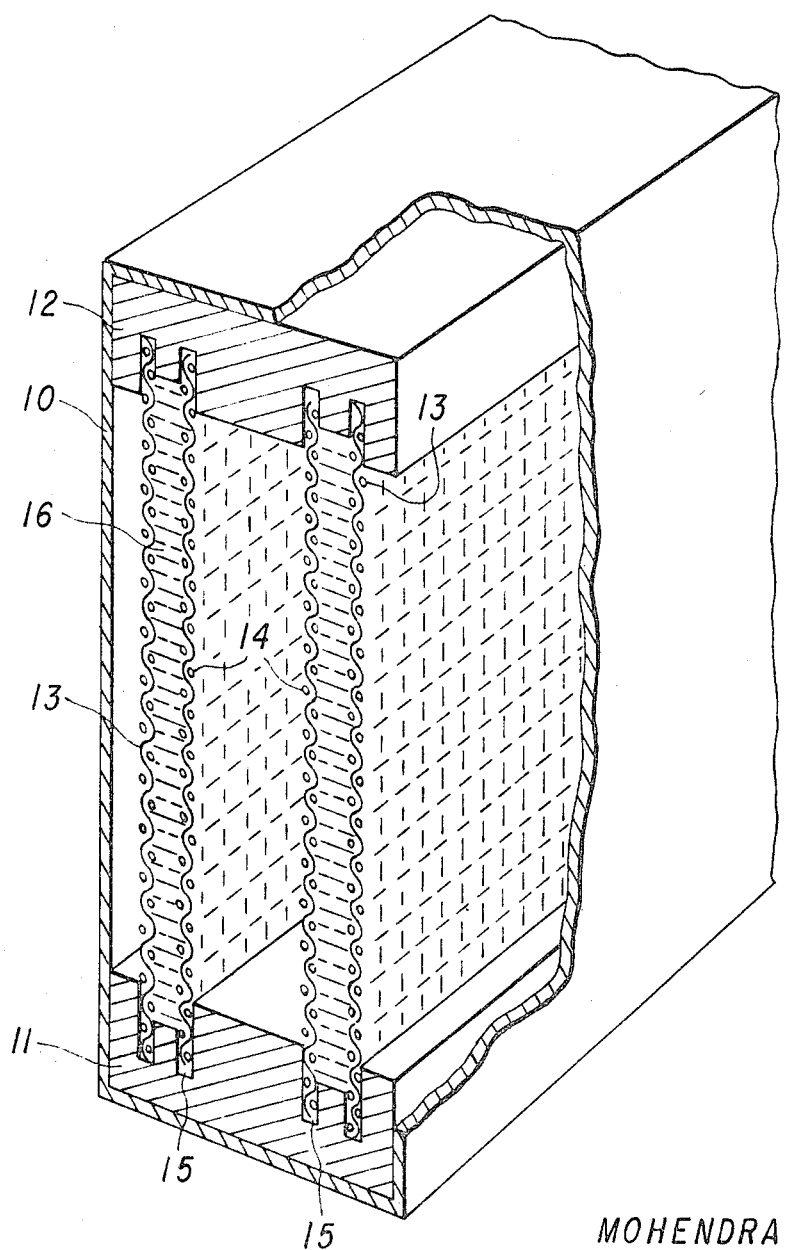

3,421,863
CERMET MATERIAL AND METHOD
OF MAKING SAME
Mohendra S. Bawa, Dallas, Leslie O. Connally, Arlington, and James K. Truitt, Dallas, Tex., assignors to Texas Instruments Incorporated, Dallas, Tex., a corporation of Delaware
Filed Mar. 4, 1966, Ser. No. 531,897
U.S. Cl. 29—182.5
Int. Cl. B22f 1/00
3 Claims

ABSTRACT OF THE DISCLOSURE

Disclosed are cermet materials formed by compression molding a mixture comprising about 80% to about 98% aluminum powder by weight and about 20% to about 2% aluminum silicate powder by weight and maintaining the molded article at a temperature of about 1,000° C. to about 1,400° C. for a period of about 4 hours to about 8 hours in an oxidizing environment. The cermet materials so formed are particularly useful as spacer members for fuel cell electrodes.

---

This invention relates to a cermet of aluminum, aluminum oxide and aluminum silicate and a method of making same.

The term "cermet" is generally used to describe alloys of metals and ceramic materials. Generally, cermets comprise a metal having dispersed therein small platelets of refractory or ceramic materials which impart ceramic-like characteristics to the metal. Conversely, the term is also used to describe a ceramic material having metallic particles dispersed in the ceramic body. Cermets are generally known in the art for their heat-resistant characteristics.

It is an object of this invention to provide a material which is heat-resistant and also resistant to corrosive environments, particularly molten inorganic salts. It is another object to provide a material which may be used as an electrical insulator at high temperatures. Another object is to provide structural members for fuel cells which must be resistant to attack by corrosive inorganic salts at temperatures up to about 650° while remaining structurally rigid and electrically insulative, and a method of making same. In accordance with the invention, a cermet is produced by heating aluminum powder and aluminum silicate under pressure in an oxidizing atmosphere. The resulting cermet is structurally rigid, machinable, resistant to attack by carbonates of the alkali earth metals and has a very high resistivity.

A particular advantage of this invention is that the cermet may be produced from readily available materials. It may be formed in any desired shape or form and may be suitably machined for a specific application. These and other objects, features and advantages of the invention will become more readily understood from the following detailed description when taken in conjunction with the appended claims and attached drawing in which the sole figure is an elevational view partially in section of a molten carbonate fuel cell utilizing insulating spacer channels of the material of this invention.

In accordance with the invention, a cermet is made from aluminum and aluminum silicate. The cermet is produced from a mixture of about 85–98% aluminum by weight and about 2–15% aluminum silicate ($Al_2O_3$ $(SiO_2)_2 \cdot 2H_2O$, commonly known as Kaolin) by weight. The mixture of powdered or granulated aluminum silicate and aluminum is subjected to a pressure of about 10,000 p.s.i. and maintained in an oxidizing atmosphere at a temperature of about 1000° C.–1400 C. for approximately 4 to 8 hours. The steps of heating and pressing may, but need not be, simultaneously performed. Under these conditions, a relatively dense cermet is produced. Presumably, the aluminum is at least partially oxidized to produce an alloy or cermet of aluminum, aluminum oxide, and aluminum silicate. The resulting alloy is dense, machinable, and resistant to corrosive environments.

The following examples are illustrative of some of the various combinations of materials and conditions for producing the cermet described.

EXAMPLE I

A pellet 1.25 inches in diameter and 0.133 inch thick was formed by subjecting a mixture comprising 98% aluminum powder by weight ($\times 200$ mesh) and 2% aluminum silicate powder by weight ($\times 325$ mesh) to a pressure of 10,000 p.s.i. in an oxygen atmosphere at 1200° C. for 8 hours. The pellet produced was an impervious machinable cermet. This pellet was not damaged by immersion for 500 hours in molten $LiNaCO_3$ maintained at 650° C. The cermet pellet was not affected by 10 heating and cooling cycles in which it was heated to about 600° C. and then plunged into cold water. The resistivity of the pellet was about 0.2 ohm-cm. at room temperature.

EXAMPLE II

A pellet 1.25 inches in diameter and 0.133 inch thick was formed by subjecting a mixture comprising 95% aluminum powder by weight ($\times 200$ mesh) and 5% aluminum silicate powder by weight ($\times 325$ mesh) to a pressure of 10,000 p.s.i. in an oxygen atmosphere at 1200° C. for 8 hours. The pellet produced was an impervious machinable cermet which was not damaged by immersion for 500 hours in molten $LiNaCO_3$ maintained at 650° C. The cermet pellet was not affected by 10 heating and cooling cycles in which it was heated to about 600° C. and then plunged into cold water. The resistivity of the alloy was about 0.2 ohm-cm. at room temperature.

EXAMPLE III

A pellet 1.25 inches in diameter and 0.133 inch thick was formed by subjecting a mixture comprising 92% aluminum powder by weight ($\times 200$ mesh) and 8% aluminum silicate powder by weight ($\times 325$ mesh) to a pressure of 10,000 p.s.i. in an oxygen atmosphere at 1200° C. for 8 hours. The pellet produced was an impervious machinable cermet which was not damaged by immersion for 500 hours in molten $LiNaCO_3$ maintained at 650° C. The cermet pellet was not affected by 10 heating and cooling cycles in which it was heated to about 600° C. and then plunged into cold water. The resistivity of the cermet was about 0.2 ohm-cm. at room temperature.

EXAMPLE IV

A pellet 1.25 inches in diameter and 0.133 inch thick was formed by subjecting a mixture comprising 90% aluminum powder by weight ($\times 200$ mesh) and 10% aluminum silicate powder by weight ($\times 325$ mesh) to a pressure of 10,000 p.s.i. in an oxygen atmosphere at 1200° C. for 8 hours. The pellet produced was an impervious machinable cermet which was not damaged by immersion for 500 hours in molten $LiNaCO_3$ maintained at 650° C. The cermet pellet was not affected by 10 heating and cooling cycles in which it was heated to about 600° C. and then plunged into cold water. The resistivity of the pellet was greater than 0.1 megohm-cm. at room temperature.

Duplicate pellets were prepared from this composition with temperatures from 1,000° C. to 1,400° C. and heating periods as short as 4 hours. All pellets of this composition exhibited the characteristics set forth above.

EXAMPLE V

A pellet 1.25 inches in diameter and 0.133 inch thick was formed by subjecting a mixture comprising 86% aluminum powder by weight (×200 mesh) and 14% aluminum silicate powder by weight (×325 mesh) to a pressure of 10,000 p.s.i. in an oxygen atmosphere at 1,200° C. for 8 hours. The pellet produced was an impervious machinable cermet which was not damaged by immersion for 500 hours in molten LiNaCO₃ maintained at 650° C. The cermet pellet was not affected by 10 heating and cooling cycles in which it was heated to about 600° C. and then plunged into cold water. The resistivity of the alloy was about 0.2 ohm-cm. a room temperature.

EXAMPLE VI

A pellet 1.25 inches in diameter and 0.133 inch thick was formed by subjecting a mixture comprising 80% aluminum powder by weight (×200 mesh) and 20% aluminum silicate powder by weight (×325 mesh) to a pressure of 10,000 p.s.i. in an oxygen atmosphere at 1,200° C. for 8 hours. The pellet produced was an impervious machinable cermet which was not damaged by immersion for 500 hours in molten LiNaCO₃ maintained at 650° C. The cermet pellet was not affected by 10 heating and cooling cycles in which it was heated to about 600° C. and then plunged into cold water. The resistivity of the cermet was about 0.2 ohm-cm. at room temperature.

The alloy produced in each of the above examples was durable and non-brittle. Since the alloys are formed by heat in an oxidizing atmosphere, the exact composition of the end product is unknown. Presumably, part of the aluminum powder is oxidized to form alumina ($Al_2O_3$) or other aluminum oxides which influence the characteristics of the alloy produced. Consequently, it will be recognized by those skilled in the art that other forms of aluminum silicate (e.g. $Al_6Si_2O_{13}$ and $Al_2SiO_5$) may be used to provide the desired ratios of aluminum oxide to aluminum and aluminum silicate in the end product without departing from the spirit and scope of this invention.

A device in which the material of this invention has found particular utility is illustrated in the figure. The device illustrated is a fuel cell which uses a molten inorganic salt electrolyte. The cell comprises a housing 10 which contains a pair of channeled spacing members 11 and 12. Each spacing member has one or more channels 15 along one surface thereof and the channeled surfaces of a pair of spacing members are opposed and spaced apart. A pair of foraminous electrodes 13 and 14 within the channels are securely positioned and spaced substantnally parallel to each other by the channels 15. Molten inorganic electrolyte 16 such as LiNaCO₃ is contained between the electrodes. The fuel cell is typically operated at about 500° C.–600° C.

In the embodiment shown, the inner electrodes 14 are the fuel electrodes and the outer electrodes 13 are the oxidant electrodes. In operation, air and carbon dioxide are passed between the oxidant electrodes 16 and housing 10. A hydrogen-containing gas is passed between the fuel electrodes 14. It will be noted that in this embodiment the spacing members 11 and 12 are exposed to the corrosive attack of a molten inorganic salt, temperatures up to 650° C., must be gas-impervious to prevent leaks from the oxidant and fuel chambers and must electrically separate the electrodes.

The cermet of this invention satisfies all the requirements for a spacing member in the above-described fuel cell. The material is resistant to thermal shock, resistant to the corrosive action of molten inorganic salts, and has a very high resistivity. Furthermore, the material is machinable. Thus channels for supporting and spacing electrodes may be readily cut into the material in any desired configuration.

Although the invention has been described with specific reference to use as a spacing member in a fuel cell, it will be understood that the alloy described can be used for many other various purposes. It is to be understood that the above-described methods and embodiments are merely illustrative of the application of the principles of the invention. Numerous other arrangements and embodiments may be devised by those skilled in the art without departing from the spirit and scope of the invention as defined by the appended claims.

What is claimed is:

1. The method of making a cermet material comprising the steps of:
   (a) forming a mixture comprising about 80% to about 98% aluminum powder by weight and about 20% to about 2% aluminum silicate powder by weight,
   (b) compression molding said mixture at about 10,000 p.s.i. in an oxidizing environment, and
   (c) maintaining the molded article at a temperature of about 1,000° C. to about 1,400° C. for a period of about 4 hours to about 8 hours in an oxidizing environment.

2. The method of claim 1 wherein said aluminum silicate is $Al_2O_3(SiO_2)_2 \cdot 2H_2O$.

3. The product produced by the process of claim 1.

References Cited

UNITED STATES PATENTS

| | | | |
|---|---|---|---|
| 2,977,251 | 3/1961 | Long et al. | 106—55 XR |
| 3,034,908 | 5/1962 | Sawchuk | 106—69 XR |
| 3,138,490 | 6/1964 | Tragert et al. | 136—86 |
| 3,269,850 | 8/1966 | Miller | 106—69 XR |

FOREIGN PATENTS

| | | |
|---|---|---|
| 696,741 | 10/1964 | Canada. |

WINSTON A. DOUGLAS, *Primary Examiner.*

DONALD L. WALTON, *Assistant Examiner.*

U.S. Cl. X.R.

75—201, 206, 223; 106—65; 136—143; 264—332